April 27, 1926.

B. F. BAKER 1,582,659

AUTOMATIC CASHIER

Filed Jan. 4, 1924

INVENTOR
B. F. Baker
BY Geo. F. Beeler
ATTORNEY

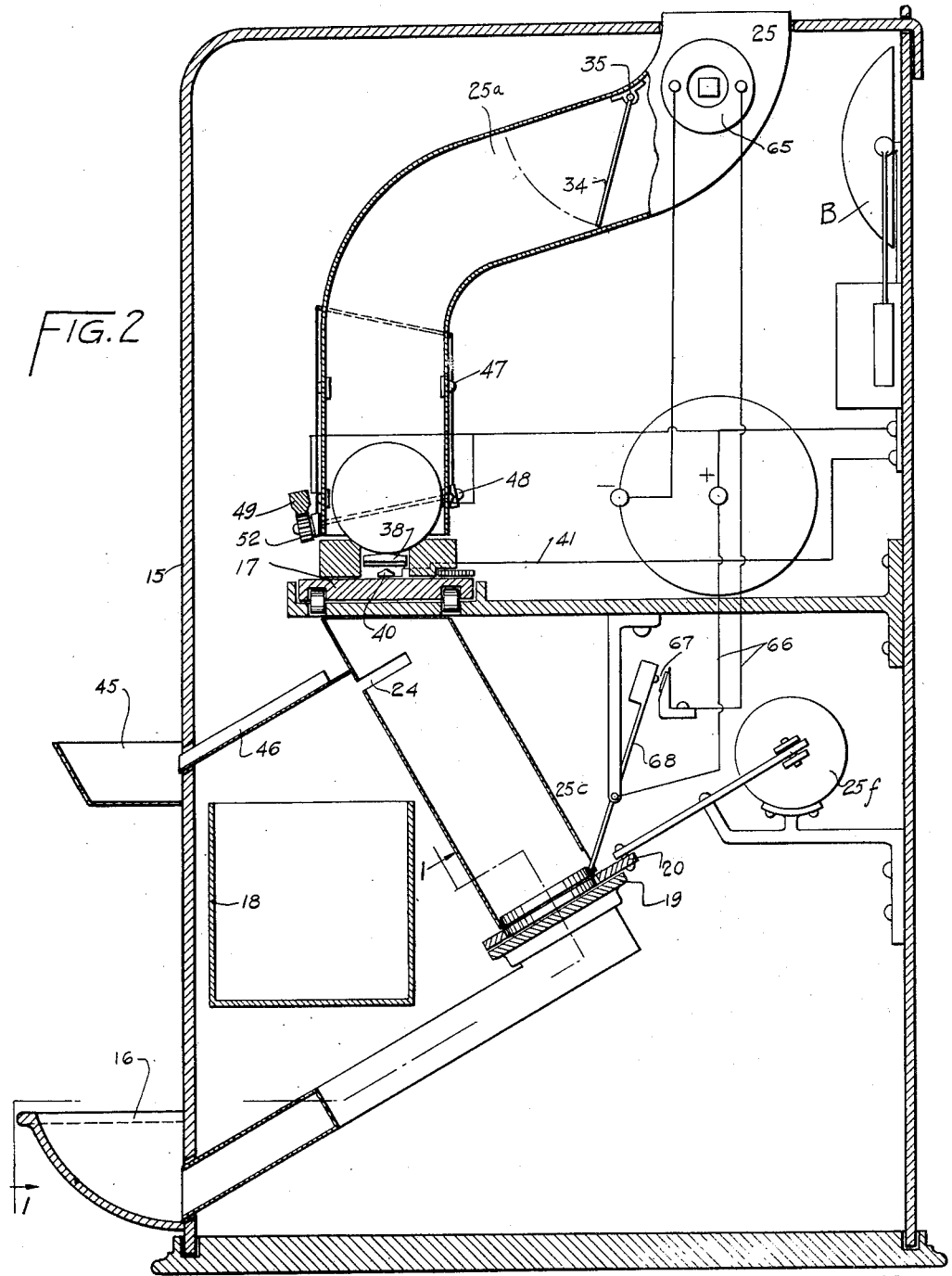

April 27, 1926.
B. F. BAKER
1,582,659
AUTOMATIC CASHIER
Filed Jan. 4, 1924    4 Sheets-Sheet 3
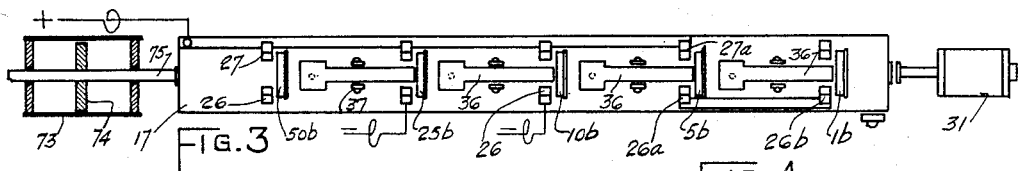
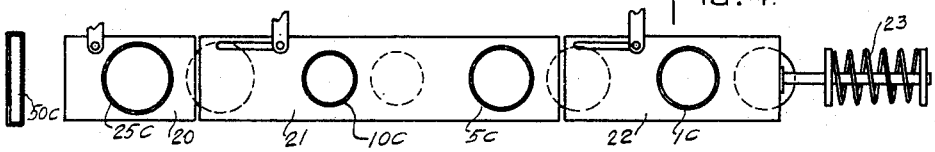
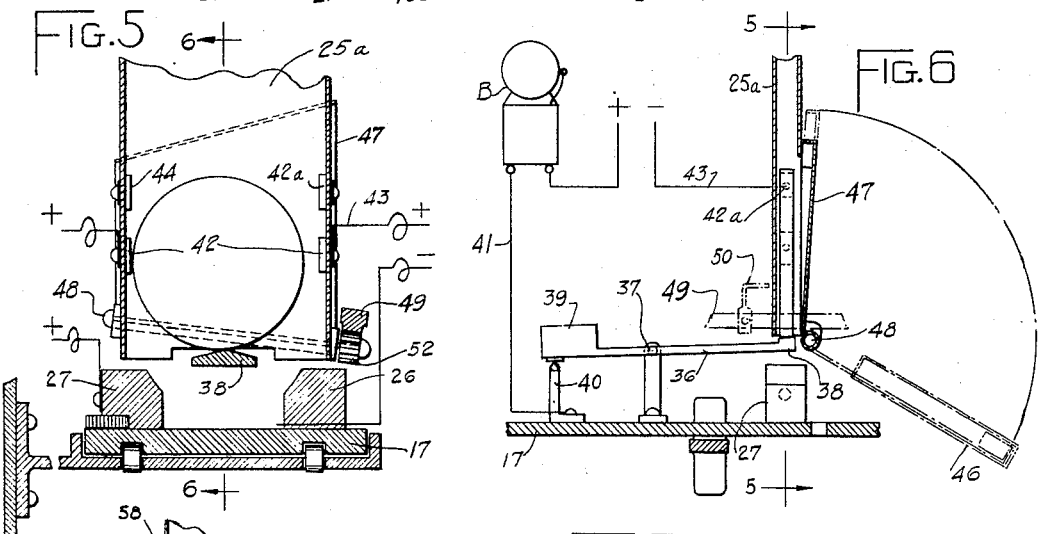
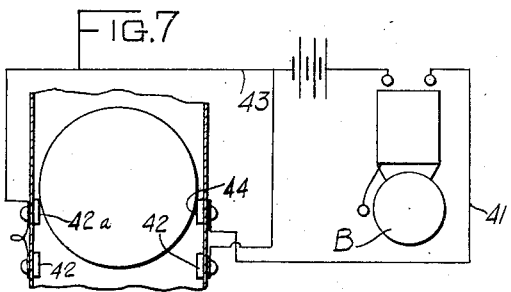
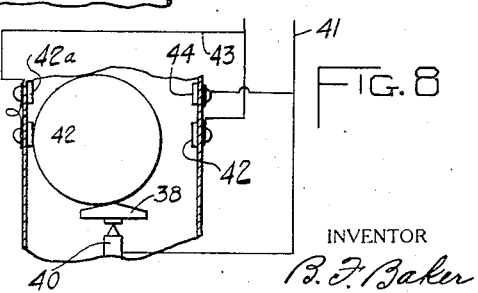
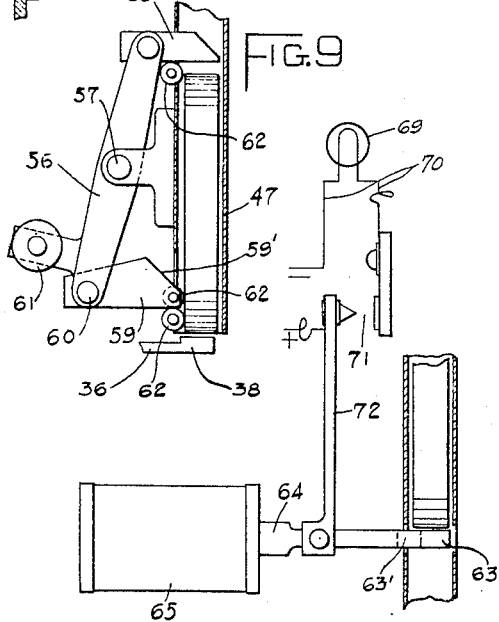
INVENTOR
B. F. Baker
BY Geo. L. Beeler
ATTORNEY April 27, 1926.
B. F. BAKER
1,582,659
AUTOMATIC CASHIER
Filed Jan. 4, 1924  4 Sheets-Sheet 4
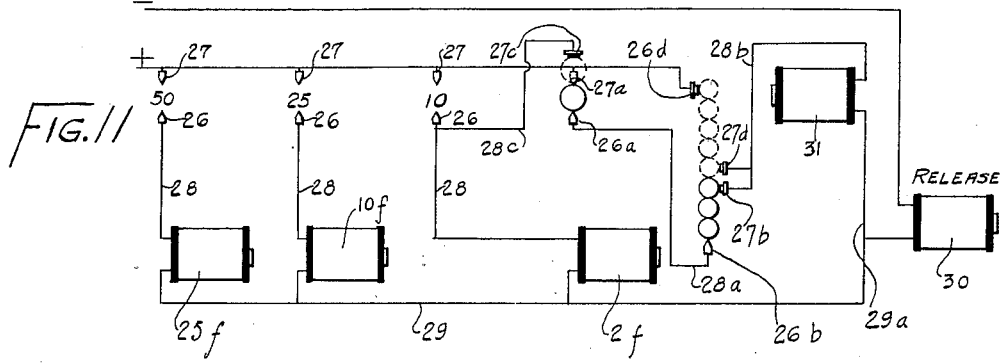
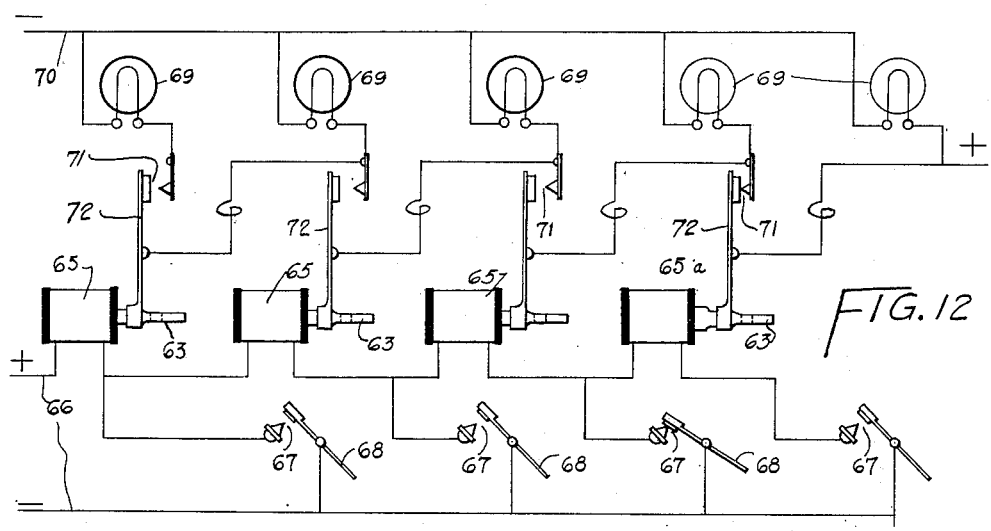
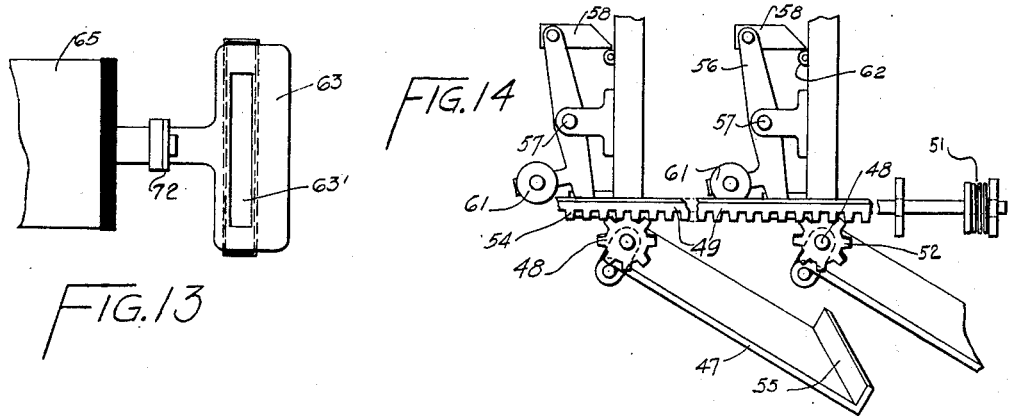
INVENTOR
B. F. Baker
BY Geo. L. Beeler
ATTORNEY Patented Apr. 27, 1926.

1,582,659

UNITED STATES PATENT OFFICE.

BERTRAM F. BAKER, OF TANNERSVILLE, NEW YORK, ASSIGNOR OF ONE-HALF TO WALTER N. McCLELLAN, OF BROOKLYN, NEW YORK.

AUTOMATIC CASHIER.

Application filed January 4, 1924. Serial No. 684,292.

*To all whom it may concern:*

Be it known that I, BERTRAM F. BAKER, a citizen of the United States, residing at Tannersville, in the county of Greene and State of New York, have invented certain new and useful Improvements in Automatic Cashiers, of which the following is a specification.

This invention relates to coin handling apparatus and has particular reference to mechanism for the automatic handling of coin or change and so designed as to dispense with the use of a ticket seller, cashier, or other analogous individual who ordinarily is employed for the purpose of receiving fees, fares, or cash and delivering tickets or other commodities and change if required.

Among the objects of the invention is to provide automatic mechanism for receiving fees or fares and for returning to the customer any required change, the apparatus being operated practically automatically or through no other effort than that of the customer in receiving the commodity purchased or passing through the gateway if the fare is paid for admission or exit through a gate or door.

A further object of the invention is to provide mechanism of the general class described that will be sufficiently prompt or rapid in the execution of its functions as to make it practical for rapid repetition as for the accommodation of rapidly moving crowds of people.

Another object of the invention is to provide automatic mechanism of a nature designed to prevent fraudulent operation of the mechanism by any means, as for instance, by the use of slugs or false coins either too large, too small, or too light, and to cause the manifestation of some suitable indicator or alarm mechanism, either audible or visible, or both, to apprise an official of the fact that the mechanism is being tampered with.

A still further object of the invention is to provide means for guarding the coin slots as to prevent the admission of a coin in the event of such a condition of the coin magazines as would prevent the proper or intended operation of the machine and at the same time to provide visible indicator means to apprise the customer or any official of the fact that the magazine mechanism is not in perfect working order.

Again, the mechanism has in view the provision of means to so control the admission of a succession of coins in the principal chutes as to prevent the proper functioning of the light coin detector and also to make it feasible for one person to insert a plurality of coins for the payment of fees for a succession of customers, the mechanism being so constructed as to automatically segregate and dispose of the coins in a corresponding succession.

Another object of the invention is to provide means to prevent the surreptitious operation of the mechanism by the insertion of means that may be withdrawn after the operation of the machine.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Fig. 2 is a vertical transverse section on the broken line 2—2 of Fig. 1.

Figs. 3 and 4 are sectional plan views on the correspondingly numbered lines of Fig. 1.

Fig. 5 is a vertical transverse sectional detail on the line 5—5 of Figs. 1 and 6.

Fig. 6 is a vertical sectional detail on the line 6—6 of Fig. 5.

Figs. 7 and 8 are diagrammatic details of the improper coin alarm mechanism.

Fig. 9 is an enlarged detail view of the successive coin controlling means.

Fig. 10 is an enlarged detail view of the automatic slot closing means and signal mechanism.

Fig. 11 is a diagram of the principal electrical mechanism.

Fig. 12 is a diagram of the circuits for the empty magazine, slot closer, and indicator systems.

Fig. 13 is a detail plan view of the slot closer.

Fig. 14 is a fragmentary front elevation of the tandem coin controlling means.

Figure 1:
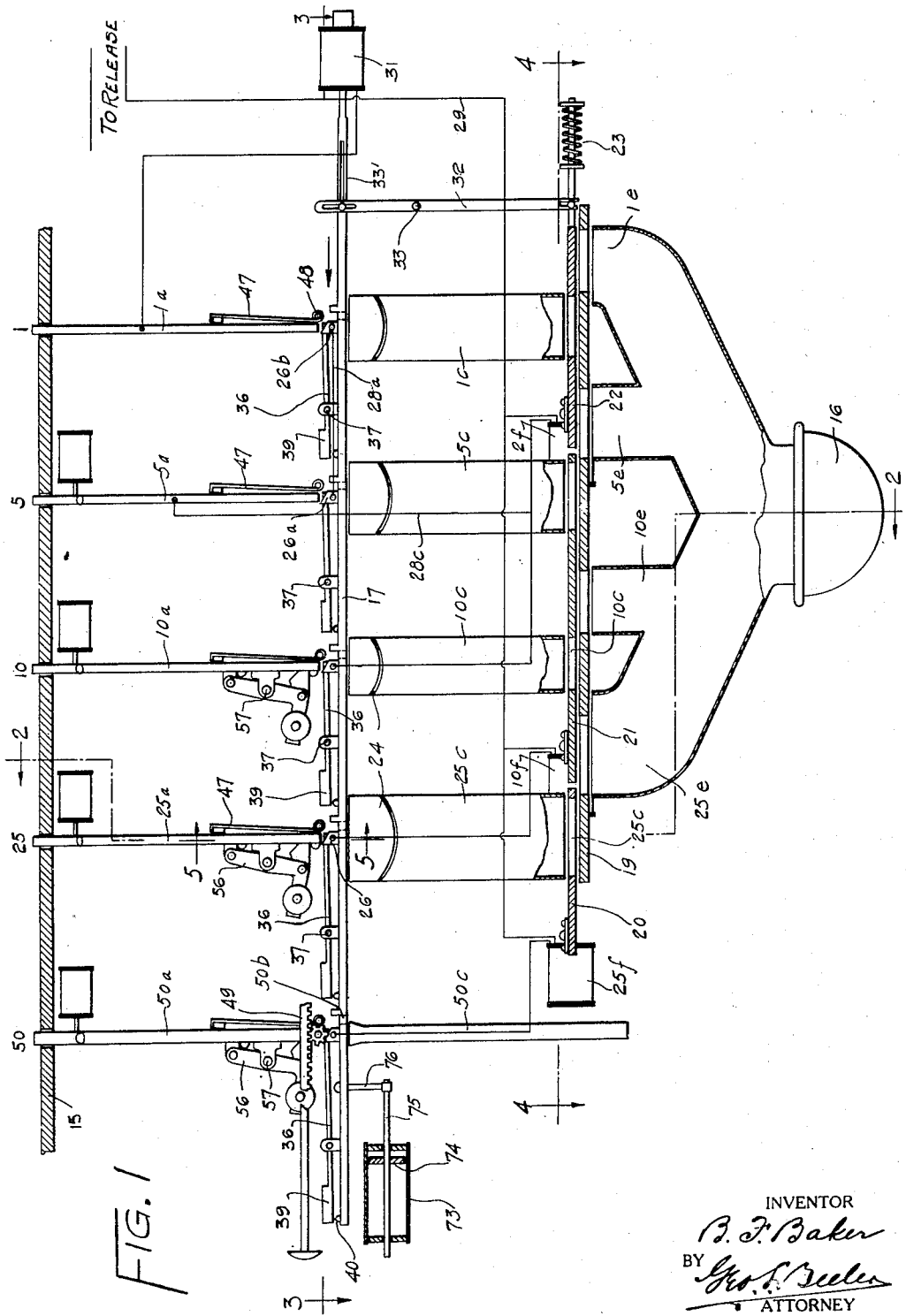
Figure 1 is a front elevation of the principal parts of the mechanism, somewhat diagrammatic and with parts in section on the broken line 1—1 of Fig. 2, looking in the direction of the arrows.

By the term "fee" as used herein is to be understood a price or cost of any service such as an admission to or exit from a building, railway car, or the like, or for the delivery of commodities or the performance of any function. It is to be noted also that while the fee prescribed in the accompanying illustrations is eight cents and that the operation of the mechanism is adapted for the accommodation or use of standard coins of the United States ranging from one cent to fifty cents, the principle of the machine and its operation would be just the same even though the details were rearranged for the accommodation of a different fee or the use of other standard coins.

In the construction of a practical embodiment of this invention any suitable casing or mechanical mechanisms may be employed. Preferably the structure will be inclosed in a suitable housing or casing 15 having a series of coin slots accessible through the top of the casing and numbered according to the illustration already made as to the several denominations of coins. 16 indicates a change cup located at the bottom and front of the casing where the customer will receive the change intended for him when he inserts a master coin larger than the prescribed fee. Leading downward from the aforesaid slots are the corresponding coin chutes 50ª, 25ª and so on, all arranged to deliver corresponding coins upon suitable transfer mechanism typified mainly by a horizontal slide member or plate 17, portions of which serve to obstruct initially the delivery of the coins from the chutes, but having a series of slits 50ᵇ and so on corresponding to the several coins and so disposed that upon the slight shifting of the transfer member any coin obstructed thereby in its passage will be admitted through the slit and conducted on its way.

Arranged beneath the several chutes are means for receiving the coins already referred to as being transferred through the transfer member slits. Below the chute 50ª is a guide 50ᶜ for the fifty cent coins, it being understood that a suitable tray or receptacle 18 will be provided within the lower portion of the casing to receive such coins. Beneath the other coin chutes are arranged a series of magazines 25ᵉ, 10ᵉ and so on, in position to receive and retain coins delivered thereinto through the corresponding slits until the coins are otherwise disposed of as soon to be explained. 19 indicates a suitable base mechanism beneath the magazines and suitably arranged for movement above the member 19 is change delivery mechanism typified by slidable plate devices 20, 21, and 22, all arranged end to end and movable in the same plane against the force of a spring 23 shown as connected to one end of the last plate member 22 and serving to so hold the change delivery mechanism as to receive the coins at the lower ends of the several magazines. These change delivery plates are movable either together as a unit or certain of them are movable independently of others for the delivery of change, and coins so delivered are guided toward the change cup 16 by any suitable guides 25ᵉ, 10ᵉ and so on.

As above premised the illustration contemplates that the fee shall be eight cents and that the four magazines described will be suitably supplied with change of the corresponding denominations for the delivery of change automatically. Should any magazine become filled with coins, succeeding coins or the surplus will pass automatically outward through slits 24 into the coin box 18. The fifty cent coins, however, will pass directly through the guide 50ᶜ without accumulation in any magazine.

Any suitable mechanism may be provided to act automatically or practically automatically after the insertion of a suitable coin to cause the transfer thereof either to the coin tray 18 or the appropriate magazine and also for the practically simultaneous delivery to the customer of any change to which he is entitled according to the denomination of the master coin, or the coin inserted for the transaction. To this end electro-magnetically operated means is provided, the same including a series of three solenoids 25ᶠ, 10ᶠ, and 2ᶠ operatively connected with the respective change delivering means 20, 21, and 22, and so coupled that the energization of any one of these solenoids will cause the movement to the right of the slide member attached thereto and any others to the right of it, while any of the change delivery devices to the left thereof will remain in normal idle position. Any of these sliding members so moved by the solenoids will convey the coin or coins in the coin holes thereof into the corresponding guides and thence to the cup 16. After the action of the change delivering means in this manner has been accomplished the spring 23 or its equivalent will return the same to normal position where the holes receive the next coins for subsequent action. The wiring and contact features of this mechanism will be understood from Figs. 1 and 11. Any master coin inserted in its slot, say fifty cents, will pass through its chute and come to rest, if of proper character, upon two normally spaced contacts 26 and 27, the latter of which are all connected in series up to and including the five cent mechanism. The first contact referred to is connected through a wire 28 to the corresponding solenoid and thence through a wire connection 29 and also a fourth solenoid 30 which will be understood as typifying means to release the commodity purchased or unlock a door or the like and located somewhere beyond the casing 15 and hence not shown in Fig. 1. Another solenoid 31 is related to the penny mechanism and will be referred to again shortly. When the fifty cent coin is inserted as just stated, closing the circuit at 26 and 27, the solenoid 25ᶠ is energized and all three of the slides 20, 21, and 22 are operated to the right and serve to deliver one quarter, one dime, one nickel, and two cents, being forty-two cents change out of the master coin and for the payment of an eight cent fee. The description just given presupposes that the plate or slide at 22 will have a depth or capacity to correspond to the number of pennies to be delivered,—if only a single penny will be delivered the plate will be of such thickness, whereas if more than one are to be delivered the plate will be thicker accordingly. A lever 32 pivoted at 33 and connected pivotally to the slide 22 at its lower end and through a pin and slot with the transfer slide 17, will actuate said slide to the left simultaneously with the delivery of the change for transferring the master coin through its slit 50ᵇ. If instead of a fifty cent master coin a quarter be inserted, it will close the circuit at the gap 26, 27 to energize the solenoid 10ᶠ, causing the delivery of a dime, a nickel, and two pennies with the same operation of the transfer slide as previously described, but with no actuation of the delivery slide 20. If a dime be inserted as the master coin the solenoid 2ᶠ will be energized and this connected only to the slide 22 will cause the delivery of two cents change only, the transfer slide being operated as before described.

A nickel inserted in the proper chute will bridge the two contacts 26ᵃ and 27ᵃ, but the former is not in circuit through its wire 28ᵃ and contact 26ᵇ, except upon the admission of a required number of pennies to complete the fee, three in this instance. The third penny admitted as shown in full lines in Fig. 11 bridges the gap between the contacts 26ᵇ and 27ᵇ connected through a wire 28ᵇ with the solenoid 31. On the admission of the one nickel and three pennies in this manner the solenoid 31 only is energized and it serves to actuate the transfer slide only, toward the left as shown by the arrow on Fig. 1, thus transferring the nickel and three pennies to their corresponding magazines and without the actuation of any change delivery devices. The completion of the circuit, however, through the solenoid 31 will be operative through the connection 29ᵃ to the release mechanism 30 for the purpose already stated.

If two nickels be inserted in the proper chute as indicated in dotted lines in Fig. 11, the circuit will be completed through the solenoid 2ᶠ from the contact 27ᶜ engaged by the second nickel and thence through the wire 28ᶜ, causing the delivery of two cents change and transfer of the two nickels as already described.

If eight pennies be inserted, the fourth and eighth pennies will complete or bridge the gap between the contacts 27ᵈ and 26ᵈ to cause the energization of the magnets 31 and 30 as already described in connection with the insertion of a nickel and three pennies. When the exact amount of change is inserted for the fee in either way the solenoid 31 actuates only the transfer slide 17 without movement of the lever 32 by reason of the slot 33'.

Arranged in each of the coin chutes and at any convenient place below the upper end or slot thereof is provided a check gate 34 so mounted or hung as at its upper end at 35 to swing inward or downward only toward the destination of the coin admitted. A coin inserted in the slot will pass by gravity down the chute, and by the weight of the coin the gate will be swung toward the left as shown in Fig. 2, allowing the coin to pass and thereafter the gate will swing toward the right until stopped by striking the bottom of the chute. The purpose of this check gate is to prevent such tampering of the device as would set into action the change making and delivering mechanism by the use of a false coin or slug to which a cord or the like might be attached for withdrawing it from the chute after the change has been delivered.

In order to prevent the operation of the machine by the use of a small coin or one that is light in weight or by a bogus coin that is lighter than a standard coin, there is provided a safety mechanism for each of the chutes in the nature of a pivoted scale beam 36 carried by the transfer slide and pivoted thereto at 37. One end of the beam is provided preferably with a head 38 having a double inclined top surface while the opposite end of the beam is sufficiently over-weighted at 39 to maintain the head end 38 elevated except when it is struck by a coin of standard weight. The weighted end 39 as shown best in Fig. 6, makes normal contact at 40 with a line 41 in circuit with a suitable signal or alarm mechanism such as a bell B. The entire scale beam including the head 38 is in the same circuit so that the bottom edge of a light coin resting thereon will serve to complete or bridge the gap between either side of the head and a contact 42, there being two of these contacts 42, one on either side of the chute and both connected in multiple through another wire 43 to the other side of the bell.

Should a coin or the like be inserted that is too large in diameter it will be checked in its descent and held between two spaced contacts, 42ᵃ in the same line 43 as just described above and 44 connected to the wire 41. The large coin thus closing the circuit will cause the swinging of the bell and any one interested will be apprised of the fact that an improper coin has been used.

Any false or improper coin as just referred to must of course be prevented from passing either into the magazine or tray into which the standard coins are intended to be delivered, and such false coin may be returned to the customer or otherwise disposed of as the management may deem best. For this purpose, however, there is indicated a cup 45 at the front of the machine and into which a slide way 46 is provided. As shown best in Fig. 6 the coin to be ejected and so returned to the customer is caused to pass or topple laterally from the head 38 and lower end of the chute upon and over a tilting trap door 47 pivoted at 48 and suitably connected to a plunger or push rod 49 within reach of any person at one end of the casing. Adjacent to the coin position a finger 50 may be carried by the rod 49 to initiate the ejection of the coin and cause it to pass over the trap door and into the slide way 46. Any conveniently arranged spring 51 or the like may be provided for returning the rod to normal position. Without being limited to any special mechanism for making the connection between the bar 49 and the trap doors, the means shown is a pinion 52 connected to the axis 48 of each trap door and with the teeth of the pinion cooperate the teeth 54 formed on the bar 49 as a rack. It is apparent that the movement of the rod 49 toward the right as in Fig. 1 will cause clockwise rotation of the pinions and corresponding movement of the trap doors. Any coin to be ejected at this time will obviously be thrust by the finger 50 approaching it and so will be caused to tilt or flop to the right over upon the then upper surface of the trap door and will be guided forward therefrom by the combined effort of the thrust of the finger and gravity action along a guide flange 55 suitably formed upon the normal upper edge portion of the trap door and so the coin or slug will be guided into the guideway or receptacle 46. If desired, according to the amount of vertical clearance provided between the axis of the trap doors and the transfer slide, the said axis 48 may be inclined more or less to augment the effective inclination of the upper surface of the trap door as just described for the delivery of the coins.

Associated with each of as many of the coin chutes as may be desired is provided what may be regarded as a tandem coin controller or means for relieving the lowermost coin of a series from the weight of any succeeding coins that may be inserted into the same slot and also serving to prevent the proper or intended operation of the coin weighing mechanism as would be the fact if a plurality of coins were arrested upon the weighing beam head at the same time. To accomplish this result and also to make it practical for the mechanism to be adapted for the accommodation of a succession of master coins for the payment of as many independent fees as one person may desire to insert at one time, there is indicated at 56 a first class lever pivoted at 57 on one side of the lower portion of the chute. To the upper end of the lever is pivoted a dog 58 to pass directly over the first admitted coin as a result of the swinging of the lever in a clockwise direction because of the weight of said coin bearing laterally upon another dog 59 pivoted at 60 and having its free end beveled at 59'. This lower end of the lever 56 may be counter weighted as at 61 for the prompt return of the lever to such position as will keep the dog 58 out of the path of an inserted coin, permitting such coin to act upon the beveled face 59'. Anti-friction rollers 62 may be employed at any desired points to facilitate the desired action. The lowermost coin of the series as just described will operate automatically as earlier described for the payment of a fee or the initiation of the change making mechanism and will be delivered from the position indicated in Fig. 9 automatically. As it does so the dog 58 will be withdrawn from its position holding the next coin in turn because the dog 59 will enter the chute toward the trap door 47, and as the next coin comes into its proper place upon the scale beam, the dog 58 will be moved forward again to check an oncoming coin. Thus it will be apparent that one person may insert as many master coins as he may desire for the payment of as many different fees and the automatic operation of the machine will not be disturbed. This tandem coin mechanism or controller is so adjusted and designed that its relation to the scale beam or weight detecting mechanism will be satisfactorily timed and one will not interfere with the operation of the other.

Inasmuch as the change mechanism is dependent for its proper operation upon the presence of coins in all the magazines necessary for the making of change it is desirable, if not essential, that means be provided for automatically indicating to the customer or the public the fact of an empty magazine and at the same time to make it impossible for the customer to insert such a coin as would necessitate the making of change and delivering the same to him in order to pay the fee. To accomplish these functions there are provided means to close the respective slots, essentially all the slots except possibly the penny slot when it would be impossible to secure the desired change. By referring now to Figs. 1 and 12 it will be seen that for each slot to be guarded is provided a gate or cut off 63 shown as being a slidable member attached in any suitable manner to or constituting a part of the core 64 of a solenoid 65 in a normally open circuit 66, the circuit being normally broken through a series of pairs of contacts 67, one contact of each pair being carried by a tilting member 68 located adjacent to the bottom of a magazine in position so that the lowermost coin in the magazine will bear downward upon one end thereof and cause the opposite end thereof to keep the contact away from the other contact. See Fig. 2. Referring again to Fig. 12 it is to be assumed that the nickel magazine is empty and so the contacts 67 in alignment therewith are shown closing the circuit, causing the energization of all the solenoids pertinent to the coin slots of higher denominations than five cents. The solenoid for the nickel slot is not energized and hence the five cent slot is not closed. This customer, therefore, instead of attempting to insert a coin larger than five cents may insert a nickel and three pennies or two nickels and so proceed in the manner already described. The nickel so inserted will of course find its way to the bottom of the nickel magazine and will break the circuit at 67 and so set the machine in operation again automatically. Any suitable gate mechanism may be provided at 63 but as indicated in Figs. 10 and 13 it consists of a plate having a slot 63' lying normally in registry with the chute so as to permit free passage of a coin, but when the solenoid is energized it will be so moved as to bar the insertion of the coin into the slot and permit the customer to withdraw it without loss.

As a means for providing visible indication of the condition of the magazines coincident with the slot locking means just described there is provided for each slot a lamp 69, these lamps being in multiple in a separate circuit 70 in which are a series of normally closed pairs of contacts 71, one contact of each pair being directly connected to and for operation by the solenoid core just described as through a finger 72. When the gate 63 is moved to position to bar the insertion of a coin the finger 72 carries one of the contacts to the broken position as shown in Fig. 12 in which illustration it is understood that all the slots for the coins above a nickel are barred and all the lamps 69 pertinent thereto are dark, while the lamps 69 for the penny and nickel slots are left glowing.

While the actuation of the transfer slide 17 and the change delivery slides at the lower ends of the magazines are intended to be operated simultaneously and almost instantaneously, it is desirable that the movement of these mechanical parts be so controlled as to make it, in a measure, time operated so as not to be defeated by a too sudden action of the electrical devices described. To this end I show retarding means in the nature of a dash pot 73 comprising a stationary cylinder within which is a movable piston 74 having a rod 75 projecting preferably from both ends of the cylinder, one end being attached as through an arm 76 to the slide 17 while the other end of the rod may be utilized for actuating a well known type of tallying device if desired, though this mechanism being conventional is not shown. The cylinder 73 being filled with a suitable fluid, either gas or oil, will prevent the too sudden movement of the piston, and therefore the retardation of the transfer slide 17 in this manner will give ample time for the several functions of the machine to be secured before the master coin will be transferred.

I claim:

1. In coin mechanism as set forth, the combination of means having a slot for the insertion of a coin for the payment of a fee, guide means for conveying the coin from the slot, transfer mechanism to receive the coin so guided and check it on its path, power means for moving the transfer mechanism to cause the delivery therefrom of the coin so checked, and means to initiate the power from the power means as a result of the engagement of the coin therewith, the transfer mechanism aforesaid being a member slidably movable at an angle to the direction of movement of the coin and having a slit adjacent to that portion that receives and checks the coin for the passage therethrough of the coin after the member is moved.

2. Mechanism as set forth in claim 1 in which the power means is electro-magnetic and the power of which is initiated through the closing of a circuit through the coin at the moment it is received by the transfer mechanism.

3. In change making mechanism, the combination of a series of devices having slots for the insertion of various denominations of coins, a series of chutes leading from said slots respectively, a series of magazines to which said chutes are directed, transfer mechanism between the chutes and the magazines and serving initially to check and hold coins received thereby from the chutes, said transfer mechanism being a member slidable at an angle to the direction of movement of the coins checked thereby, and provided with a slit normally offset from the chute adjacent thereto, but movable into registry with the chute as a result of the advent of a coin at such place, and means set into operation automatically by the advent of a coin upon the transfer mechanism for delivering proper change from magazines remote from the coin admitted, and for causing the transfer of said coin from the transfer mechanism.

4. In change making mechanism, the combination of means having a series of slots for the insertion of coins of various denominations, means to guide the coins so inserted, transfer means associated with the guide means and serving to receive and momentarily check the movement of the coins, said transfer means comprising a member common to all the guiding means and having a coin slit for each coin guided thereto, the several slits being offset from the guiding means whereby the coins are momentarily checked, a series of magazines associated with all the respective guiding means except that for the highest denomination, and power means serving to deliver the proper amount of change from the magazines according to the denomination of the master coin inserted and for moving the transfer means to transfer therefrom any coin checked thereby, to the predetermined magazine.

5. In mechanism of the nature set forth for making change for a master coin, the combination of a series of magazines for receiving and holding change coins of different denominations, movable delivery means for change coins associated with the delivery ends of the magazines, means to guide the master coin into the machine, means to cause automatic operation of the change delivering means as a result of the advent of the master coin, and coin transfer means above the magazines, said transfer means comprising a plate having a series of slits arranged transversely therein and movable lengthwise to bring the slits simultaneously into registry with the coin guiding means for delivering coins into the magazines.

In testimony whereof I affix my signature.

BERTRAM F. BAKER.